United States Patent [19]

Kruckenberg

[11] 4,053,465
[45] Oct. 11, 1977

[54] CYANOPHENYL-AZO-AMINOPHENYL DYESTUFFS

[75] Inventor: Winfried Kruckenberg, Leverkusen, Germany

[73] Assignee: Bayer Aktiengesellschaft, Leverkusen, Germany

[21] Appl. No.: 612,431

[22] Filed: Sept. 11, 1975

[30] Foreign Application Priority Data

Sept. 11, 1974 Germany .............................. 2443482

[51] Int. Cl.² .................... C09B 29/08; C09B 29/26; D06P 1/06; D06P 3/24
[52] U.S. Cl. ................................ 260/207.3; 260/205; 260/206; 260/207; 260/207.1; 260/207.5; 260/458 R; 260/465 E; 260/573
[58] Field of Search ............. 260/205, 206, 207, 207.3, 260/207.1; 8/41 R, 41 A, 41 B, 41 C

[56] References Cited

U.S. PATENT DOCUMENTS

| | | | |
|---|---|---|---|
| 1,483,084 | 2/1924 | Green et al. | 260/207.3 |
| 2,173,417 | 9/1939 | Huber | 260/207.3 X |
| 2,384,734 | 9/1945 | Felix et al. | 260/207.3 X |
| 2,387,987 | 10/1945 | Felix et al. | 260/207.3 |
| 2,888,450 | 5/1959 | Kruckenberg | 260/155 |
| 3,337,522 | 8/1967 | Wegmuller | 260/158 |
| 3,627,752 | 12/1971 | Cornelius et al. | 260/205 |
| 3,709,872 | 1/1973 | Koller | 260/207.1 |

FOREIGN PATENT DOCUMENTS

| | | | |
|---|---|---|---|
| 237,739 | 8/1955 | United Kingdom | 260/207.3 |
| 585,609 | 2/1947 | United Kingdom | 260/207.3 |

*Primary Examiner*—Floyd D. Higel
*Attorney, Agent, or Firm*—Plumley and Tyner

[57] ABSTRACT

Dyestuffs of the formula

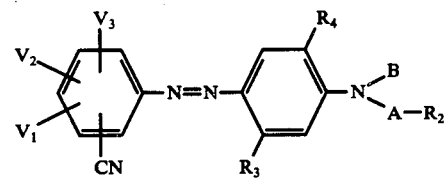

wherein
B denotes $(CH_2)_n$—$R_1$ or alkenyl,
$R_1$ denotes hydrogen, cyano, carbalkoxy, alkoxy or phenyl,
$R_2$ denotes hydrogen, cyano, alkoxy or sulphato,
$R_3$ denotes hydrogen, alkyl, alkoxy, alkylcarbonylamino or sulphatoalkylcarbonylamino,
$R_4$ denotes hydrogen, alkyl or alkoxy,
$V_1$ denotes hydrogen, chlorine, bromine or cyano,
$V_2$ denotes hydrogen, chlorine, bromine, cyano, alkyl, trifluoromethyl, methylsulphonyl or ethylsulphonyl,
$V_3$ denotes hydrogen, chlorine or alkyl,
A denotes —$(CH_2)_n$— or —$(CH_2)_n$—O—$(CH_2)_n$— and
$n$ denotes an integer from 1 to 4
and wherein
either $R_2$ must denote a sulphato radical or $R_3$ must denote a sulphatoalkylcarbonylamino radical, are suitable for the dyeing of natural and synthetic fibre materials containing amide groups.

2 Claims, No Drawings

CYANOPHENYL-AZO-AMINOPHENYL DYESTUFFS

The invention relates to water-soluble azo dyestuffs which in the form of the free acid correspond to the formula

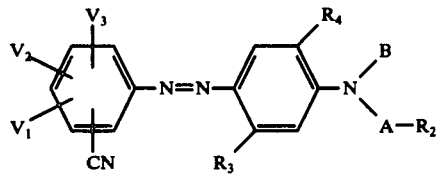

wherein
B denotes $(CH_2)_n$–$R_1$ or alkenyl,
$R_1$ denotes hydrogen, cyano, carbalkoxy, alkoxy or phenyl,
$R_2$ denotes hydrogen, cyano, alkoxy or sulphato,
$R_3$ denotes hydrogen, alkyl, alkoxy, alkylcarbonylamino or sulphatoalkylcarbonylamino,
$R_4$ denotes hydrogen, alkyl or alkoxy,
$V_1$ denotes hydrogen, chlorine, bromine or cyano,
$V_2$ denotes hydrogen, chlorine, bromine, cyano, alkyl, trifluoromethyl, methylsulphonyl or ethylsulphonyl,
$V_3$ denotes hydrogen, chlorine or alkyl,
A denotes —$(CH_2)_n$— or —$(CH_2)_n$—O—$(CH_2)_n$— and
$n$ denotes an integer from 1 to 4
and wherein
either $R_2$ must denote a sulphato radical or $R_3$ must denote a sulphatoalkylcarbonylamino radical,
their preparation and their use for dyeing natural and synthetic textile materials.

Suitable alkyl and alkoxy groups are those with 1 to 4 C atoms, above all methyl, methoxy and ethoxy.

Suitable alkenyl groups are butenyl and above all propenyl.

Preferred dyestuffs correspond, in the form of the free acid, to the formula

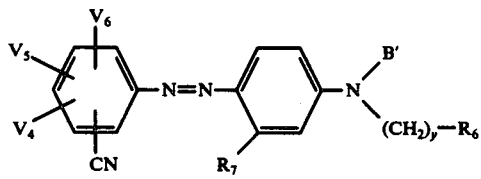

wherein
B' denotes $(CH_2)$—$R_5$ or propenyl,
$R_5$ denotes hydrogen, cyano, methoxy, ethoxy or phenyl,
$R_6$ denotes hydrogen, methoxy, ethoxy or sulphato,
$R_7$ denotes hydrogen, methyl, acetylamino or sulphatomethylcarbonylamino,
$n$ denotes 1, 2, 3 or 4,
$y$ denotes 1, 2, 3 or 4, but only 2, 3 or 4 if $R_6$ = sulphato,
$V_4$ denotes hydrogen, chlorine or cyano,
$V_5$ denotes hydrogen, chlorine, methyl or cyano and
$V_6$ denotes hydrogen or methyl
and wherein,
either $R_6$ denotes sulphato or $R_7$ denotes sulphatomethylcarbonylamino and especially of the formula

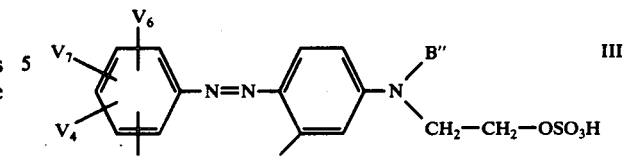

wherein
B'' . . . $(CH_2)_x$—H or propenyl,
$x$ = 1, 2 or 3,
$V_4$ and $V_6$ have the abovementioned meaning and
$V_7$ denotes hydrogen, chlorine or methyl.

The new dyestuffs are obtained when amines of the formula

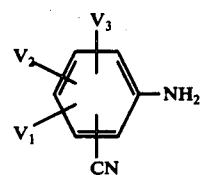

wherein
$V_1$, $V_2$ and $V_3$ have the abovementioned meaning are diazotised and coupled with compounds of the formula

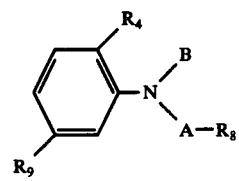

wherein
A, B and $R_4$ have the abovementioned meaning,
$R_8$ denotes hydrogen, cyano, alkoxy, hydroxyl or sulphato and
$R_9$ represents hydrogen, methyl, alkoxy, alkylcarbonylamino, hydroxyalkylcarbonylamino or sulphatoalkylcarbonylamino
with the proviso that one of the radicals $R_8$ and $R_9$ possesses a hydroxyl or sulphato group and, if one of the radicals $R_8$ and $R_9$ contains a hydroxyl group, this group is esterified with sulphuric acid or chlorosulphonic acid.

Examples of suitable diazo components of the formula IV are 2,4-dicyanoaniline, 3,4-dicyanoaniline, 2,6-dicyano-4-methylaniline, 2-methylsulphonyl-4-cyanoaniline, 2-trifluoromethyl-3-chloro-4-cyanoaniline, 2,5-dichloro-4-cyanoaniline, 3-chloro-4-cyanoaniline, 2-cyano-5-chloroaniline, 2,4-dicyano-3,5-dimethylaniline, 2,4-dicyano-6-methylaniline and 2,4,6-tricyanoaniline.

Examples of suitable coupling components V are N-(2-cyanoethyl)-N-(2-hydroxyethyl)-3-methylaniline, N-(2-methoxyethyl)-N-(2-hydroxyethyl)-aniline, N-ethyl-N-(2-hydroxyethyl)-3-methylaniline, N,N-diethyl-3-hydroxy-acetylaminoaniline, N-propenyl-N-(2-hydroxyethyl)-3-methylaniline, N-propyl-N-(2-hydroxyethyl)-3-methylaniline and their sulphuric acid half-esters.

The dyestuffs of the formula I are outstandingly suitable for dyeing natural and synthetic fiber materials containing amide groups, especially synthetic high molecular weight polyamides, in accordance with dyeing processes which are in themselves known.

The dyeings obtained are distinguished by particular clarity and good general fastness properties.

EXAMPLE 1

35.8 g of N-ethyl-N-(2-hydroxyethyl)-3-methylaniline are mixed with 58.5 g of pyridine. 27 g of chlorosulphonic acid are added dropwise whilst stirring and cooling at below 25° C, and thereafter 8 g of ammonia gas are passed in.

41 g of pyridine are then distilled off under reduced pressure. 60 ml of water are added, 51 g of pyridine-water mixture are again distilled off, under reduced pressure, and the residue is diluted with 40 ml of water.

An aqueous solution of N-ethyl-N-(2-sulphatoethyl)-3-methylaniline is obtained.

EXAMPLE 2

15.3 g of 5-chloro-2-cyanoaniline in 137 g of 96% strength sulphuric acid are diazotised with 17 ml of nitrosylsulphuric acid and the mixture is poured onto 400 g of ice, whilst stirring. The excess nitrite is destroyed with amidosulphonic acid, the solution of the diazotised amine is added dropwise over the course of 30 to 45 minutes to 71 g of the solution obtained according to Example 1 and the mixture is stirred for a further 4 hours.

The dyestuff is isolated by filtration, washing and drying and corresponds to the formula

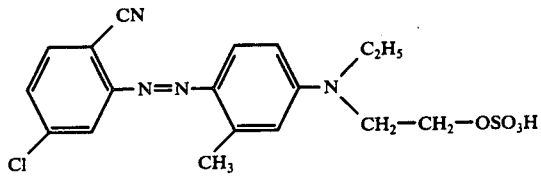

EXAMPLE 3

0.1 g of the dyestuff obtained according to Example 2 are dissolved in 100 ml of hot water. 5 ml of 10% strength ammonium acetate are added and the mixture is diluted with water to a volume of 500 ml.

10 g of a polyamide fabric are introduced into the dye bath. The bath is heated to the boil over the course of 20 minutes, and after adding 4 ml of 10% strength acetic acid is kept at the boil for one hour. The fabric is then rinsed and dried at 70° to 80° C.

A polyamide fabric dyed in a very light-fast, clear and brilliant scarlet-red shade is obtained.

EXAMPLE 4

Further dyestuffs, in the shades indicated, are obtained in accordance with the instruction of Example 2 if the diazo components and coupling components indicated in the table which follows are reacted with one another.

| No. | Diazo component | Coupling component | Colour shade |
| --- | --- | --- | --- |
| 1 | 2,4-Dicyano-3,5-dimethylaniline | N-ethyl-N-(2-sulphatoethyl)-3-methylaniline | bluish-tinged red |
| 2 | 2,5-Dicyanoaniline | N-ethyl-N-(2-sulphatoethyl)-3-methylaniline | yellowish-tinged red |
| 3 | 2,4-Dicyanoaniline | N-ethyl-N-(2-sulphatoethyl)-3-methylaniline | bluish-tinged red |
| 4 | 2,5-Dimethyl-4-cyanoaniline | N-ethyl-N-(2-sulphatoethyl)-3-methylaniline | yellowish-tinged orange |
| 5 | 2,6-Dicyano-4-methylaniline | N-ethyl-N-(2-sulphatoethyl)-3-methylaniline | orange |
| 6 | 2,4,6-Tricyanoaniline | N-ethyl-N-(2-sulphatoethyl)-3-methylaniline | bluish-tinged red |
| 7 | 2,4-Dicyano-6-methylaniline | N-ethyl-N-(2-sulphatoethyl)-3-methylaniline | bluish tinged red |
| 8 | 3,4-Dicyanoaniline | N-ethyl-N-(2-sulphatoethyl)-3-methylaniline | scarlet |
| 9 | 2,5-Dicyanoaniline | N-ethyl-N-(4-sulphatobutyl)-3-methylaniline | yellowish-tinged red |
| 10 | 2-Cyano-5-chloroaniline | N-ethyl-N-(4-sulphatobutyl)-3-methylaniline | scarlet |
| 11 | 2,4-Dicyanoaniline | N-ethyl-N-(4-sulphatobutyl)-3-methylaniline | bluish-tinged red |
| 12 | 2,4-Dicyanoaniline | N-ethyl-N-(3-sulphatopropyl)-3-methylaniline | bluish-tinged red |
| 13 | 2,4-Dicyanoaniline | N-ethyl-N-[2-(2-sulphatoethoxy)-ethyl]-3-methylaniline | bluish-tinged red |
| 14 | 2,4-Dicyanoaniline | N-butyl-N-(4-sulphatobutyl)-3-methylaniline | ruby-red |
| 15 | 2,4-Dicyanoaniline | N-ethyl-N-(2-sulphatoethyl)-2,5-dimethoxy-aniline | red-violet |
| 16 | 2,4-Dicyanoaniline | N-(2-cyanoethyl)-N-(2-sulphatoethyl)-aniline | scarlet |
| 17 | 2-Cyano-5-chloroaniline | N-(2-cyanoethyl)-N-(2-sulphatoethyl)-aniline | reddish-tinged yellow |
| 18 | 2-Cyano-5-chloroaniline | N-(2-cyanoethyl)-N-(2-sulphatoethyl)-3-methylaniline | yellowish-tinged orange |
| 19 | 2,4-Dicyanoaniline | N-(2-cyanoethyl)-N-(2-sulphatoethyl)-3-methylaniline | red |
| 20 | 2,4-Dicyanoaniline | N-(2-methoxycarbonylethyl)-N-(2-sulphato-ethyl)-aniline | yellowish-tinged red |
| 21 | 2,4-Dicyanoaniline | N-(2-cyanoethyl)-N-(2-sulphatoethyl)-3-acetylaminoaniline | red |
| 22 | 2,4-Dicyanoaniline | N-ethyl-N-(2-sulphatoethyl)-3-acetyl-aminoaniline | bluish-tinged red |
| 23 | 2-Cyano-5-chloroaniline | N-ethyl-N-(2-sulphatoethyl)-3-acetyl-aminoaniline | red |
| 24 | 2-Cyano-5-chloroaniline | N,N-diethyl-3-sulphatomethylcarbonyl-aminoaniline | yellowish-tinged red |
| 25 | 2,4-Dicyano-3,5-dimethylaniline | N,N-diethyl-3-sulphatomethylcarbonyl-aminoaniline | bluish-tinged pink |
| 26 | 3-Chloro-4-cyanoaniline | N,N-diethyl-3-sulphatomethylcarbonyl-aminoaniline | yellowish-tinged red |
| 27 | 2,5-Dichloro-4-cyanoaniline | N,N-diethyl-3-sulphatomethylcarbonyl-aminoaniline | bluish-tinged red |
| 28 | 2,4-Dicyanoaniline | N,N-diethyl-3-sulphatomethylcarbonyl-aminoaniline | bluish-tinged pink |
| 29 | 3,4-Dicyanoaniline | N,N-diethyl-3-sulphatomethylcarbonyl-aminoaniline | yellowish-tinged red |
| 30 | 2,4-Dicyano-6-chloroaniline | N,N-dipropyl-3-sulphatomethylcarbonyl- | bluish-tinged |

-continued

| No. | Diazo component | Coupling component | Colour shade |
|---|---|---|---|
|  |  | aminoaniline | violet |
| 31 | 2-Cyano-5-chloroaniline | N-benzyl-N-(2-sulphatoethyl)-3-methylaniline | reddish-tinged orange |
| 32 | 2,4-Dicyanoaniline | N-benzyl-N-(2-sulphatoethyl)-3-methylaniline | bluish-tinged red |
| 33 | 2,5-Dichloro-4-cyanoaniline | N-benzyl-N-(2-sulphatoethyl)-3-methylaniline | red |
| 34 | 2,5-Dichloro-4-cyanoaniline | N-benzyl-N-(2-sulphatoethyl)-aniline | yellowish-tinged red |
| 35 | 2,4-Dicyanoaniline | N-benzyl-N-(2-sulphatoethyl)-aniline | yellowish-tinged red |
| 36 | 2,4-Dicyanoaniline | N-(2-phenylethyl)-N-(2-sulphatoethyl)-aniline | yellowish-tinged red |
| 37 | 2,5-Dichloro-4-cyanoaniline | N-(2-phenylethyl)-N-(2-sulphatoethyl)-aniline | red |
| 38 | 2-Cyano-5-chloroaniline | N-(2-phenylethyl)-N-(2-sulphatoethyl)-3-methylaniline | scarlet |
| 39 | 2,4-Dicyanoaniline | N-(2-phenylethyl)-N-(2-sulphatoethyl)-3-methylaniline | bluish-tinged red |
| 40 | 3-Chloro-4-cyanoaniline | N,N-diethyl-3-(1-sulphatopropionyl)-amino | yellowish-tinged red |
| 41 | 2,4-Dicyanoaniline | N-propenyl-N-(2-sulphatoethyl)-3-methyl-aniline | bluish-tinged red |
| 42 | 2,4-Dicyanoaniline | N-propyl-N-(2-sulphatoethyl)-3-methylaniline | bluish-tinged red |

I claim:
1. Water-soluble dyestuff which in the form of the free acid corresponds to the formula

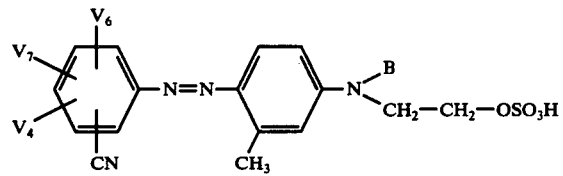

wherein
B is $(CH_2)_x$—H or propenyl where $x$ is 1, 2, or 3;
$V_4$ is hydrogen, chlorine, or cyano;
$V_6$ is hydrogen or methyl; and
$V_7$ is hydrogen, chlorine, or methyl.
2. Dyestuff of the formula

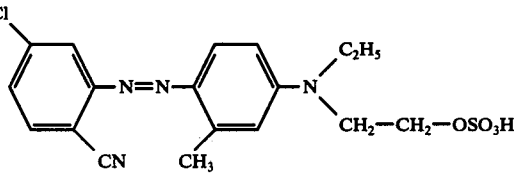

* * * * *